US007973261B2

(12) United States Patent
Lee et al.

(10) Patent No.: US 7,973,261 B2

(45) Date of Patent: Jul. 5, 2011

(54) COOLING STRUCTURE FOR PLASMA LIGHTING SYSTEM

(75) Inventors: Sung-Hwa Lee, Gyeongsangnam-Do (KR); Young-Bok Son, Gyeongsangnam-Do (KR); Kwang-Won Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 1406 days.

(21) Appl. No.: 10/539,552

(22) PCT Filed: Dec. 18, 2002

(86) PCT No.: PCT/KR02/02384

§ 371 (c)(1),
(2), (4) Date: Jun. 16, 2005

(87) PCT Pub. No.: WO2004/055863

PCT Pub. Date: Jul. 1, 2004

(65) Prior Publication Data

US 2006/0243707 A1 Nov. 2, 2006

(51) Int. Cl.
*B23K 9/02* (2006.01)
*H05B 41/16* (2006.01)
*H01J 17/20* (2006.01)

(52) U.S. Cl. ..................... 219/121.49; 315/248; 315/39; 313/637

(58) Field of Classification Search .................. 219/757, 219/121.57, 121.49; 315/39, 248, 263; 313/231.31, 313/111.21, 248, 113
See application file for complete search history.

(56) References Cited

U.S. PATENT DOCUMENTS 4,874,036 A * 10/1989 Masuda .......................... 165/42
5,998,934 A * 12/1999 Mimasu et al. ............... 315/118

FOREIGN PATENT DOCUMENTS

| | | | |
|---|---|---|---|
| CN | 1350698 | A | 5/2002 |
| JP | 54-068082 | A | 5/1979 |
| JP | 57172648 | A | 1/1983 |
| JP | 62241257 | A | 4/1988 |
| JP | 63-159211 | U | 10/1988 |
| JP | 2001- 155505 | A | 6/2001 |
| KR | 2000050827 | A | 8/2000 |
| KR | 20020031848 | A | 5/2002 |
| KR | 20020054161 | A | 7/2002 |

* cited by examiner

*Primary Examiner* — Quang T Van

(74) *Attorney, Agent, or Firm* — Birch, Stewart, Kolasch & Birch, LLP

(57) ABSTRACT

Disclosed is a cooling structure for a plasma lighting system comprising a fan housing having at least two discharge ports having different flow rates for introducing external air into a case and cooling heat generating components in the case. The structure intensively cools heat generating components of high temperature such as a magnetron, thereby prolonging a life span of the components and enhancing a performance of a system.

25 Claims, 8 Drawing Sheets

COOLING STRUCTURE FOR PLASMA LIGHTING SYSTEM

TECHNICAL FIELD

The present invention relates to a plasma lighting system using microwave, and more particularly, to a cooling structure for a plasma lighting system which can easily cool inner heat generating components of the plasma lighting system.

BACKGROUND ART

In general, a plasma lighting system using microwave is a device for obtaining visible rays or ultraviolet rays by adding microwave to an electrodeless light bulb. The lighting system has a long life span when compared with a general incandescent lamp or a fluorescent lamp, and has an excellent lighting effect.

FIG. 1 is a longitudinal sectional view showing a conventional plasma lighting system.

The conventional plasma lighting system comprises: a case 1; a magnetron 3 arranged in the case 1 for generating microwave; a waveguide 5 arranged in the case 1 for transmitting the microwave generated from the magnetron 3; a light bulb 7 having lighting material therein and protruded in front of the case 1 for generating light; a mesh screen 9 fixed at an exit of the waveguide 5 for shielding microwave and passing light; and a reflective mirror 11 fixed to a frontal surface of the case at a circumference of the mesh screen 9 for reflecting the light generated at the bulb 7 forward.

A high voltage generator 13 for supplying high voltage to the magnetron 3 is installed inside of the case 1.

The waveguide 5 is provided with a shaft hole 5*a* at the center thereof, and a rotational shaft 10 for rotating the light bulb 7 passes the shaft hole 5*a*. Also, a bulb motor 8 to which the rotational shaft 10 is engaged is installed at the rear side of the waveguide 5 to rotate and cool the light bulb 7.

Especially, a blowing unit 14 for cooling the magnetron 3, the high voltage generator 13, and the bulb motor 8 are installed at the rear side of the case 1. The blowing unit 14 includes a fan housing 15 corresponding to a passage where external air is introduced in the case, a fan 16 provided in the fan housing 15, and a fan motor 17 for rotating the fan 16.

In said plasma lighting system, when a driving signal is inputted to the high voltage generator 13, the high voltage generator 13 boosts an AC power source from the exterior and supplies the boosted high voltage to the magnetron 3.

The magnetron 3 resonates by the high voltage supplied from the high voltage generator 13 and generates microwave of high frequency. The generated microwave is transmitted to the inner portion of the mesh screen 9 through the waveguide 9 to discharge the lighting material sealed in the light bulb 7, thereby generating light having a unique emit spectrum.

The light generated from the bulb 7 is reflected forward through the reflection mirror 11 and illuminates a lighting space.

In the meantime, when the plasma lighting system is operated, the fan motor 17 is together operated. At this time, by the fan 16 operated by the fan motor 17, external air of the case 1 passes a suction port 15*a* and two discharge ports 15*b* and 15*b*' of the fan housing 15, cools the magnetron 3 and the high voltage generator 13, and is discharged out through an outlet port 1*a* formed in front of the case 1.

However, in the conventional plasma lighting system, since the two discharge ports 15*b* and 15*b*' provided to the fan housing 15 are formed to have the same area, the magnetron 3 which generates heat relatively higher than any other parts can not be effectively cooled.

Accordingly, when high heat generating components such as the magnetron 3 are not sufficiently cooled, a durable life span is shortened or a performance is greatly degraded. To solve this, entire capacities of the fan and the fan motor have to be increased to sufficiently cool the high heat generating components.

Also, the conventional plasma lighting system has a structure that external air is sucked from the rear side of the case 1 and discharged to the frontal side of the case 1, so that warm air which has cooled various kinds of components is discharged to the lighting space to provide uncomfortable feeling to a user. To solve this, that is, to discharge the air from the frontal side of the case 1 to the other side, an additional discharge duct is required.

DISCLOSURE OF THE INVENTION

Therefore, it is an object of the present invention to provide a cooling structure for a plasma lighting system which can effectively cool heat generating components of high temperature such as a magnetron to prolong life span of the components and improve a performance of the system by making a discharge flow rate different according to heat generation amounts of the components and a design condition without unnecessarily enlarging a fan capacity.

To achieve these objects, there is provided a cooling structure for a plasma lighting system including a fan housing having at least two discharge ports having different discharge flow rates for cooling heat generating components in the case by introducing external air in the case In the discharge ports of the fan housing, prolonged ducts for guiding the discharge air to each heat generating component are provided.

At least one prolonged duct is composed of a distribution duct having at least two discharge ports in order to intensively cool at least two specific components of the heat generating components.

According to one preferred embodiment of the present invention, the case is provided with the fan housing at the rear side thereof to introduce external air, and provided with a case outlet for discharging air that cooled the heat generating components at the frontal side thereof. At the case outlet, a discharge guide member is formed with a round shape.

According to another embodiment of the present invention, the case is formed with a double cylinder structure having an inner case and an outer case. The external air circulating by the fan housing is introduced into the rear surface of the inner case, passes the inside of the inner case, flows to the inside of the outer case, and is discharged to the rear surface discharge port of the outer case.

According to still another embodiment of the present invention, a plurality of discharge ducts for discharging air which passed the inside of the case are provided at an outer surface of the case by being connected to the case.

Herein, the case includes a first discharge port connected to a frontal portion of the discharge duct, and a second discharge port connected to a middle portion of the discharge duct.

According to still another embodiment of the present invention, the discharge duct has first discharge port at the rear portion thereof, and second discharge port at the lateral portion thereof.

According to still another embodiment of the present invention, the case has a plurality of radiation fins protruded toward the inner side of the discharge duct.

According to still another embodiment of the present invention, a plurality of radiation fins are formed at the outer surface of the case.

Since a discharge flow rate is different according to heat generation amounts of the components and a design condition, a system according to the present invention can effectively cool the heat generating components of high temperature such as the magnetron, thereby prolonging life span of the components and improving a performance of the system without unnecessarily enlarging a fan capacity.

Also, in the present invention, since air which has cooled the heat generating components in the case is discharged to the rear side of the case, warm air is not discharged to a lighting space, thereby not causing uncomfortable feeling to the user and enhancing convenience.

MODES FOR CARRYING OUT THE PREFERRED EMBODIMENTS

Hereinafter, the cooling structure of a plasma lighting system according to the present invention will be explained with reference to the attached drawings.

Figure 1:
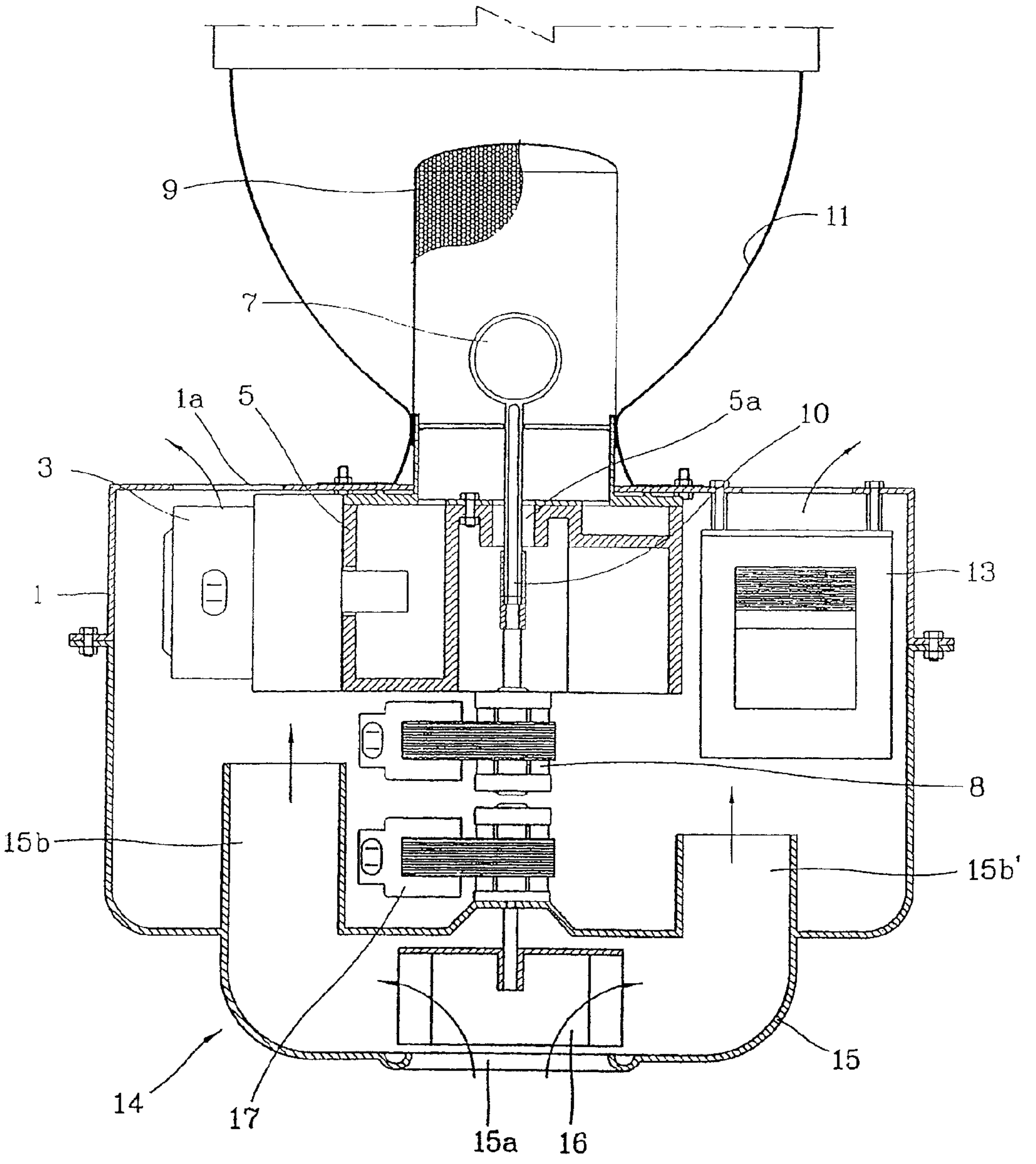
FIG. 1 BACKGROUND ART
FIG. 1 is a longitudinal sectional view showing the conventional plasma lighting system.
Figure 2:
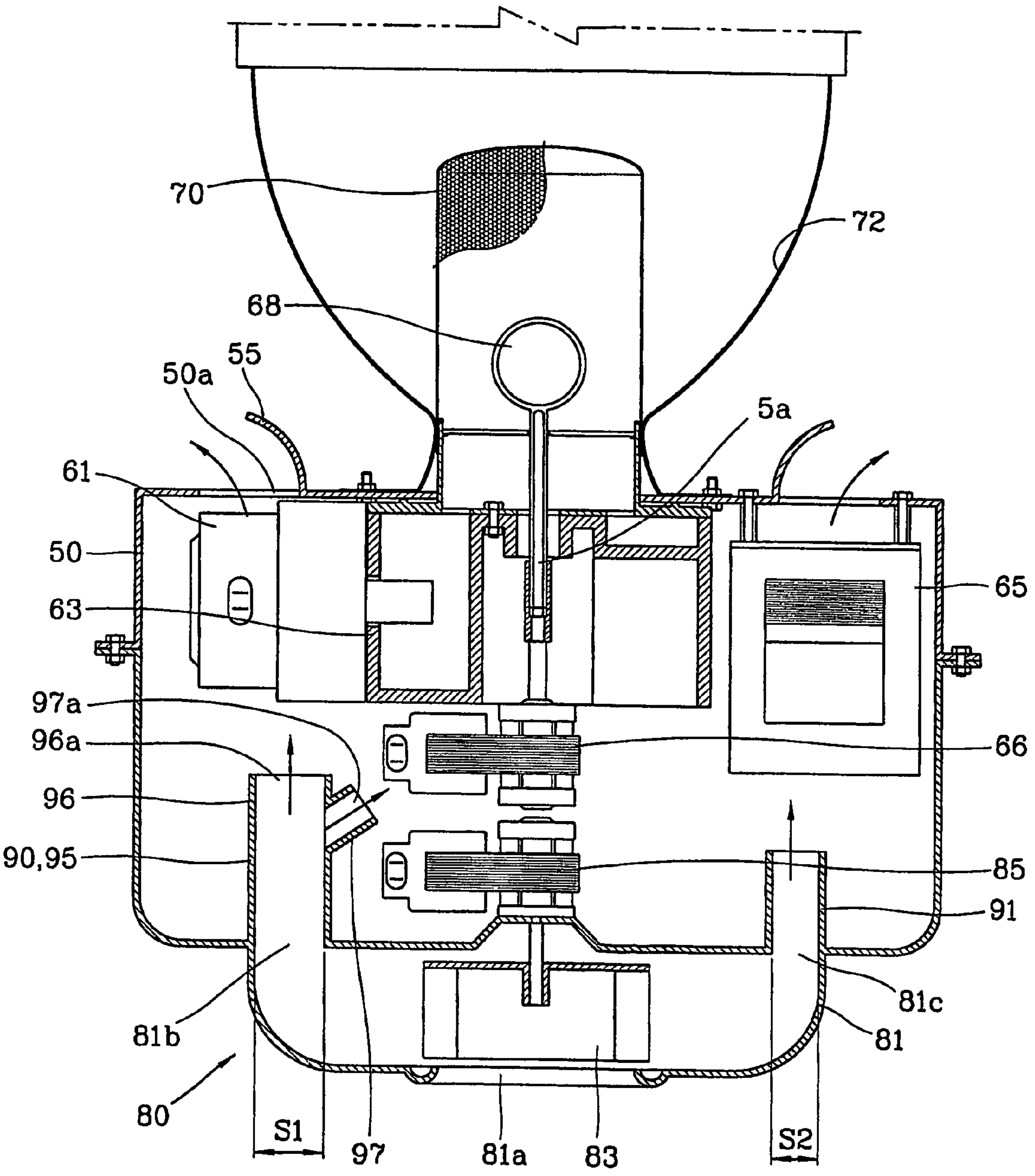
FIG. 2 is a longitudinal sectional view showing a plasma lighting system according to the first preferred embodiment of the present invention.

FIG. 2 is a longitudinal sectional view showing a plasma lighting system according to the first preferred embodiment of the present invention.

Referring to FIG. 2, in the case 50, there are provided a magnetron 61 for generating microwave; a waveguide 63 for transmitting the microwave generated from the magnetron 61; a high voltage generator 65 for providing a high voltage to the magnetron 61; and a bulb motor 66 for rotating and cooling a light bulb 68.

Herein, the waveguide 63 is located at the inner center portion of the case 50. At both sides of the waveguide 63, the magnetron 61 and the high voltage generator 65 are respectively located, and at the rear side of the waveguide 63, the bulb motor 66 is located.

In front of the case 50, there are provided the light bulb 68 for generating light by the microwave, a mesh screen 70 for shielding the microwave and passing light, and a reflection mirror 72 for reflecting the light generated at the bulb 68 forward.

A blowing unit 80 for cooling heat generating components such as the magnetron 61, the high voltage generator 65, and the bulb motor 66 is installed at the rear side of the case 50.

The blowing unit 80 includes a fan housing 81 corresponding to a passage where external air is introduced in the case 50, a fan 83 provided in the fan housing 81, and a fan motor 85 for rotating the fan 83.

The fan housing 81 is provided with a suction port 81 a at the frontal center portion of the fan housing 81. The fan 83 is located at the inner side of the suction port 81*a*. Especially, the fan housing 81 has a first discharge port 81*b* and a second discharge port 81*c* for respectively discharging air toward the magnetron 61 and the high voltage generator 65.

Herein, since the magnetron 61 generates heat of higher temperature than the high voltage generator 65, larger discharge flow rate has to be formed at the place where the magnetron 61 and the bulb motor 66 are located. According to this, a sectional area S1 of the first discharge port 81*b* is formed to be larger than a sectional area S2 of the second discharge port 81*c*.

It is possible that a ratio of the sectional areas of the first discharge port 81*b* and the second discharge port 81*c* is 6:4.

At the first and second discharge ports 81*b* and 81*c* of the fan housing 81, prolonged ducts 90 and 91 for guiding discharge air to the heat generating components such as the magnetron 61 and the high voltage generator 65 are respectively formed.

The prolonged duct 90 connected from the first discharge port 81*b* to the magnetron 61 is composed of a distribution duct 95 having a first sub discharge port 96*a* and a second sub discharge port 97*a* in order to intensively cool the magnetron 61 and the bulb motor 66, respectively.

Also, in order to more intensively cool the magnetron 61, the first sub discharge port 96*a* of the distribution duct 95 that intensively discharges air to the magnetron 61 is formed to be larger than the second sub discharge port 97*a* that intensively discharges air to the bulb motor 66.

That is, the distribution duct 95 is composed of a main duct 96 having the first sub discharge port 96*a* for making discharge flow rate great, and a diverged duct 97 divided from the main duct 96 and having the second sub discharge port 97*a*.

In the meantime, in front of the case 50, a case discharge port 50*a* for discharging air that has cooled the heat generating components such as the magnetron 61 is formed. The case discharge port 50*a* provided with a discharge guide member 55 for guiding the discharged air to the lateral side direction of the case 50 is formed with a round shape.

In the meantime, various kinds of the fan 83 provided in the fan housing 80 such as a sirocco fan, an axial fan, etc. can be installed according to the design condition. Also, even if the prolonged ducts 90 and 91 are formed at the fan housing 80 as a single body or separated ones.

Also, the number and a direction of the discharge ports 81*b* and 81*c* of the fan housing 81, the prolonged ducts 90 and 91, and the distribution duct 95 can be constructed differently according to locations of the heat generating components arranged in the case 50.

The cooling structure for the plasma lighting system according to the first preferred embodiment of the present invention will be explained.

When a high voltage boosted from the high voltage generator 65 is supplied to the magnetron 61, the magnetron 61 generates microwave and radiates it to the inside of the mesh screen 70 through the waveguide 63. Also, lighting material in the bulb 68 is formed in plasma state by electric field due to the microwave, thereby generating light and illuminating the lighting space.

Also, since the bulb motor 66 and the fan motor 85 are simultaneously operated with the high voltage generator 65, the bulb motor 66 cools the bulb 68 with rotating it and the fan motor 85 makes external air of the case 50 flow into the case 50 to cool the, heat generating components such as the magnetron 61, the high voltage generator 65, the bulb motor 66, and the fan motor 85.

In the meantime, in accordance with that the fan 83 is operated, external air introduced through the suction port 81*a* of the fan housing 81 intensively cools the magnetron 61, the bulb motor 66, and the high voltage generator 65 through the respective prolonged ducts 90 and 95 by the first and second discharge ports 81*b* and 81*c*.

Herein, since a sectional area of the first discharge port 81*b* is larger than that of the second discharge port 81*c*, larger amount of external air is provided to the distribution duct 95 toward the magnetron 61 and the bulb motor 66. Also, since the distribution duct 95 is divided into two first and second sub discharge ports 96*a* and 97*a*, the external air is intensively supplied to the magnetron 61 and the bulb motor 66.

Like this, the heat generating components in the case 50 can be intensively cooled more efficiently by providing more external air to the magnetron 61 that relatively generates high heat and by forming the distribution structure to intensively supply the external air to the specific components such as the magnetron 61 and the bulb motor 66.

Accordingly, in the present invention, more external air is provided to the heat generating components which are relatively overheated, so that a cooling is efficiently performed, thereby prolonging a life span and enhancing a reliability of the device.

The air that has cooled the inner components of the case 50 is discharged out through the case discharge port 50*a* formed in front of the case 50. At this time, the discharge air is discharged toward the outer direction of the case 50 by the discharge guide member 55 formed in front of the case discharge port 50*a*.

Hereinafter, the same construction parts with those of the first preferred embodiment will be given the same reference numerals and their explanations will be omitted for the simplicity purpose.

Figure 3:
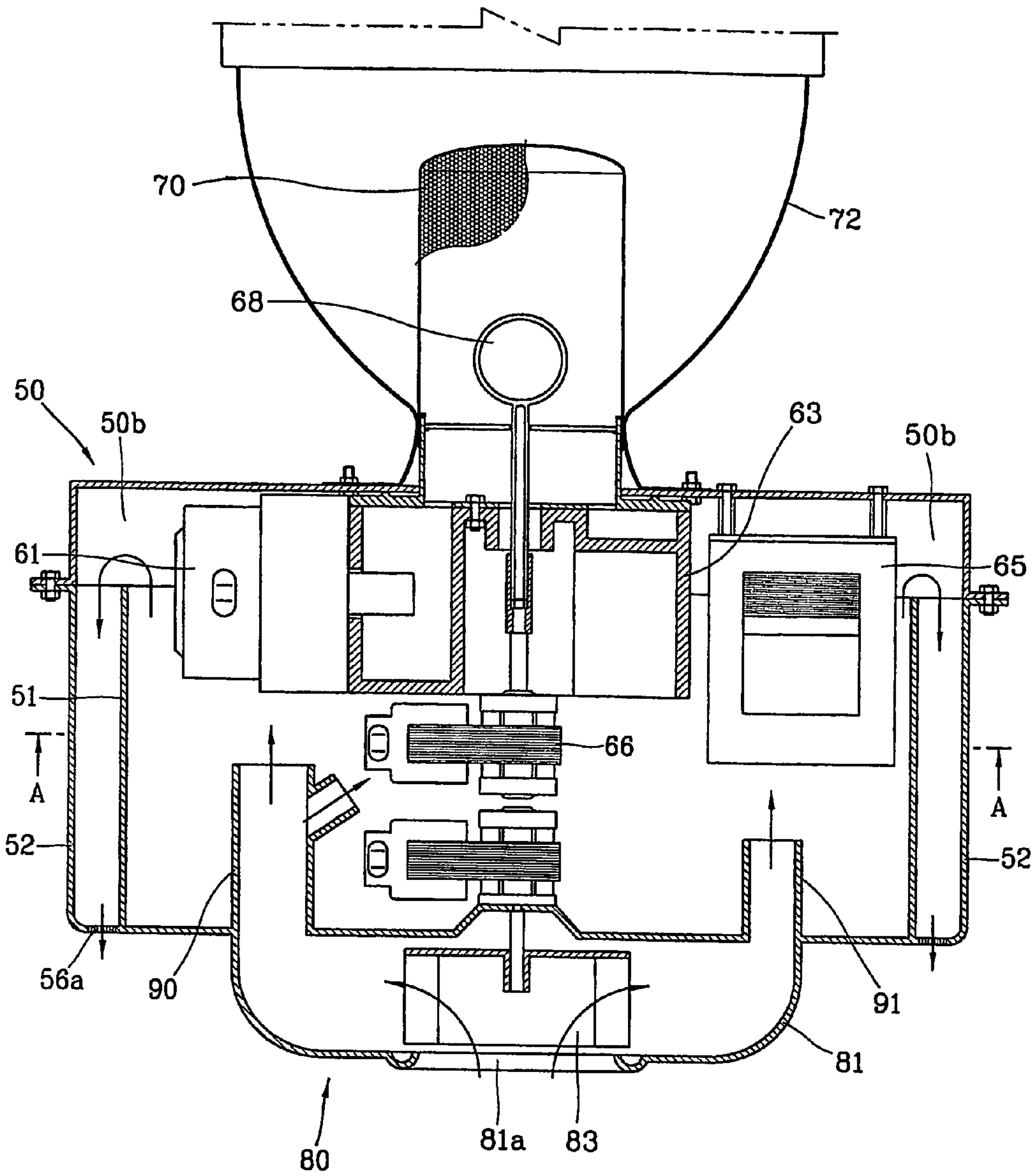
FIG. 3 is a longitudinal sectional view showing a plasma lighting system according to the second preferred embodiment of the present invention.
Figure 4:
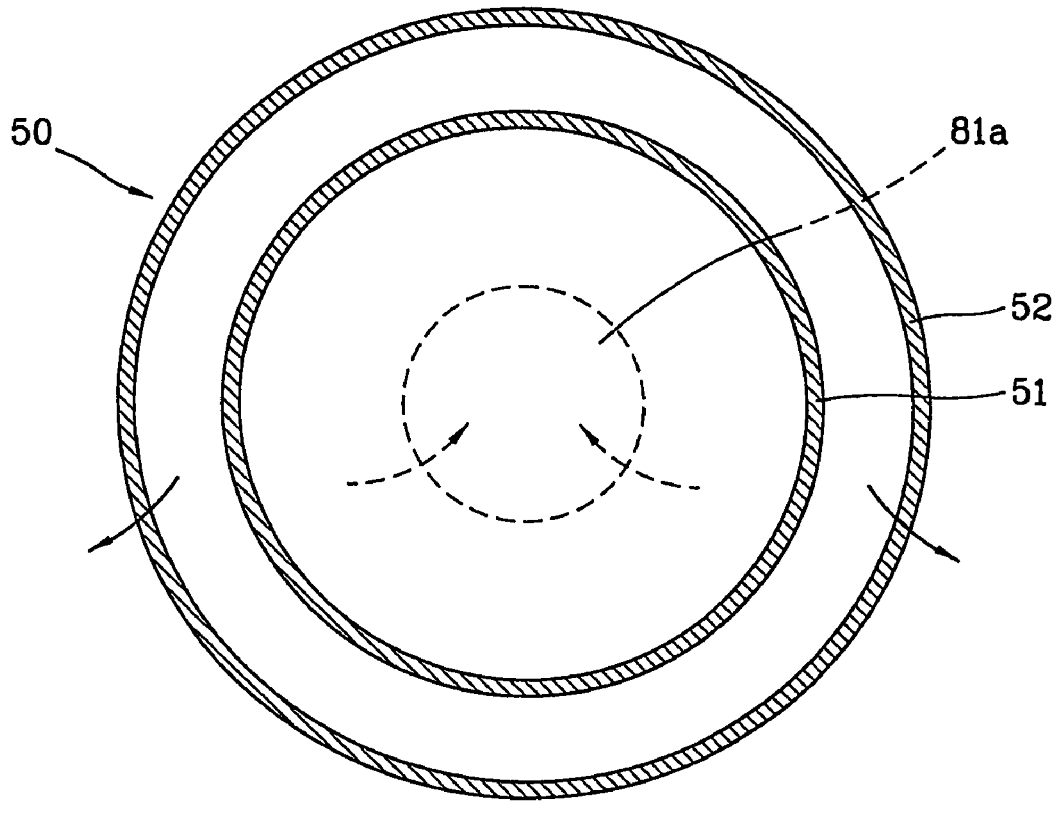
FIG. 4 is a sectional view of a case taken along line A-A of FIG. 3.

FIG. 3 is a longitudinal sectional view showing a plasma lighting system according to the second preferred embodiment of the present invention, and FIG. 4 is a sectional view of a case taken along line A-A of FIG. 3.

In the aforementioned first preferred embodiment, the case is constructed to discharge air to the frontal side thereof. However, in the second preferred embodiment of the present invention, the case 50 is constructed to discharge air to the rear side thereof.

That is, in the second preferred embodiment, the case 50 is formed with a double cylinder structure having an inner case 51 and an outer case 52. A discharge path 50*b* connected to the outer case 52 is formed in front of the inner case 51, and a discharge port 56*a* for discharging air outside is formed at the rear surface of the outer case 52.

Accordingly, external air introduced into the inner case 51 by the fan 83 cools the heat generating components such as the magnetron 61 in the case 51, flows toward the inside of the outer case 50 through the discharge path 50*b*, and is discharged out through the discharge port 56*a* of the outer case 50.

In the meantime, at the discharge port 56*a* of the outer case 52, a filtering member for preventing foreign substances including insects is preferably installed at the discharge port 56*a* of the outer case 52.

In the second preferred embodiment of the present invention, by discharging cooled air toward the rear of the case 50, user's convenience can be enhanced, and by providing the discharge passage connected to the outer case 52, air discharge is smoothly performed.

Figure 5:
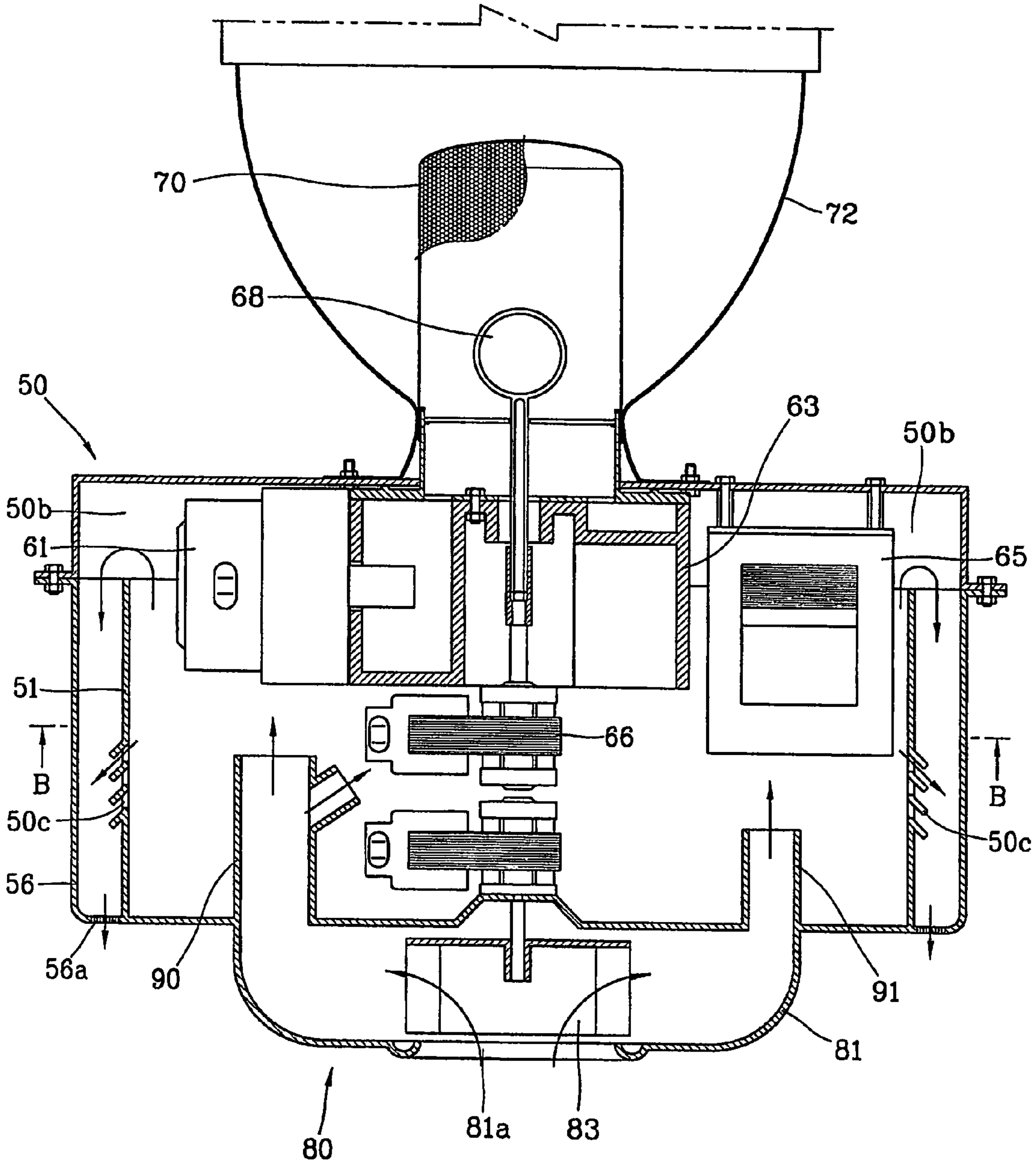
FIG. 5 is a longitudinal sectional view showing a plasma lighting system according to the third preferred embodiment of the present invention.
Figure 6:
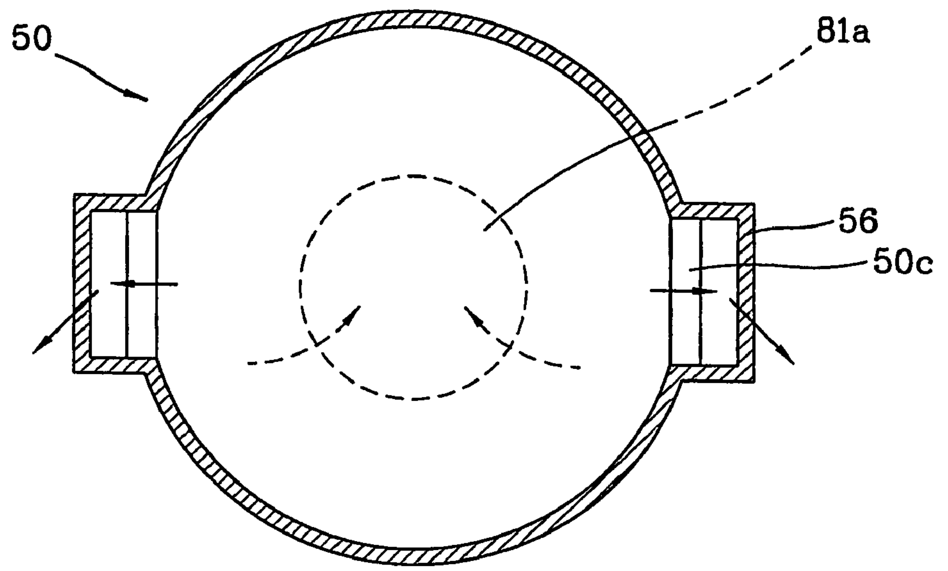
FIG. 6 is a sectional view of a case taken along line B-B of FIG. 5.

FIG. 5 is a longitudinal sectional view showing a plasma lighting system according to the third preferred embodiment of the present invention, and FIG. 6 is a sectional view of a case taken along line B-B of FIG. 5.

In the aforementioned second preferred embodiment, the case is composed of a double structure and air is discharged to the rear side of the case. However, in the third embodiment of the present invention, air is discharged to the rear of the case 50 through the discharge port 56*a* of the discharge duct 56 prolonged at the outer surface of the case 50.

That is, said two discharge ducts 56 are provided at both sides of the case 50 and prolonged along the case 50 for discharging air that has passed the inside of the case 50 to the rear of the case 50 through the discharge port of the duct.

Also, the case 50 includes a discharge path 50*b* connected to the frontal portion of the discharge duct 56 and a discharge opening 50*c* connected to the middle portion of the discharge duct 56.

Herein, whereas the discharge path 50*b* of the case 50 is formed as a completely opened structure, the discharge opening 50*c* is formed as a grill structure composed of a plurality of holes by being cut from a part of the case 50, curved, and opened. At this time, a discharge direction of the discharge opening 50*c* of the case 50 is preferably formed toward the discharge port 56*a* of the discharge duct 56.

In the cooling structure of the plasma lighting system according to the third preferred embodiment of the present invention, the air which passes the inside of the case 50 is easily discharged out in a state that a construction of the case 50 is simplified and the flow resistance is minimized through the discharge path 50*b* and the discharge opening 50*c* of the case 50.

Figure 7:
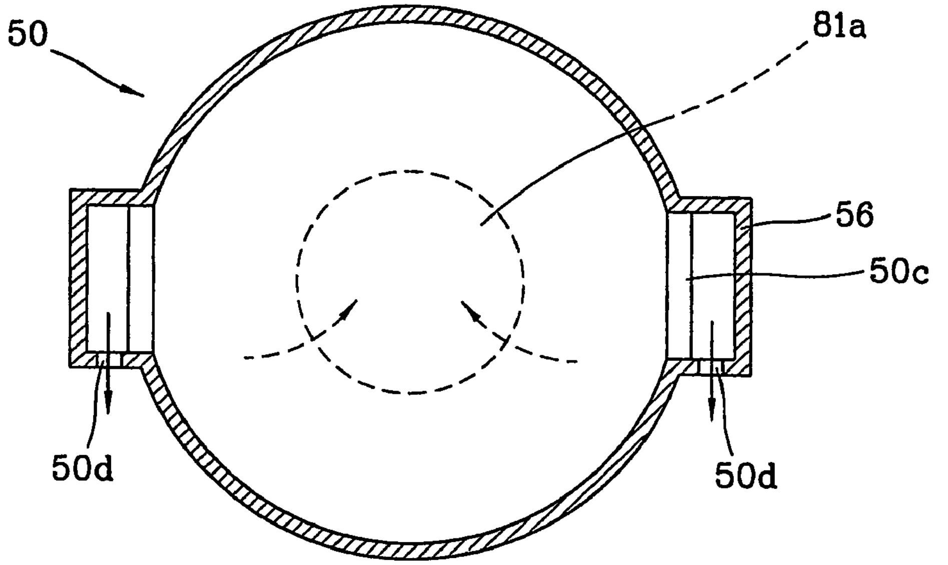
FIG. 7 is a cross-sectional view of the case according to the fourth preferred embodiment of the present invention.

FIG. 7 is a cross-sectional view of the case according to the fourth preferred embodiment of the present invention.

The fourth preferred embodiment of the present invention is the same with the third preferred embodiment except that an additional discharge port 50*d* for discharging air outside is formed at the lateral surface of the discharge duct 56.

The additional discharge port 50*d* is also preferably formed as the grill structure similarly to the discharge opening 50*c* of the case 50 in the third preferred embodiment.

In the fourth embodiment of the present invention, air can be discharged more easily by magnifying the discharge passage of the discharge duct 56 and thereby minimizing a flow resistance.

Figure 8:
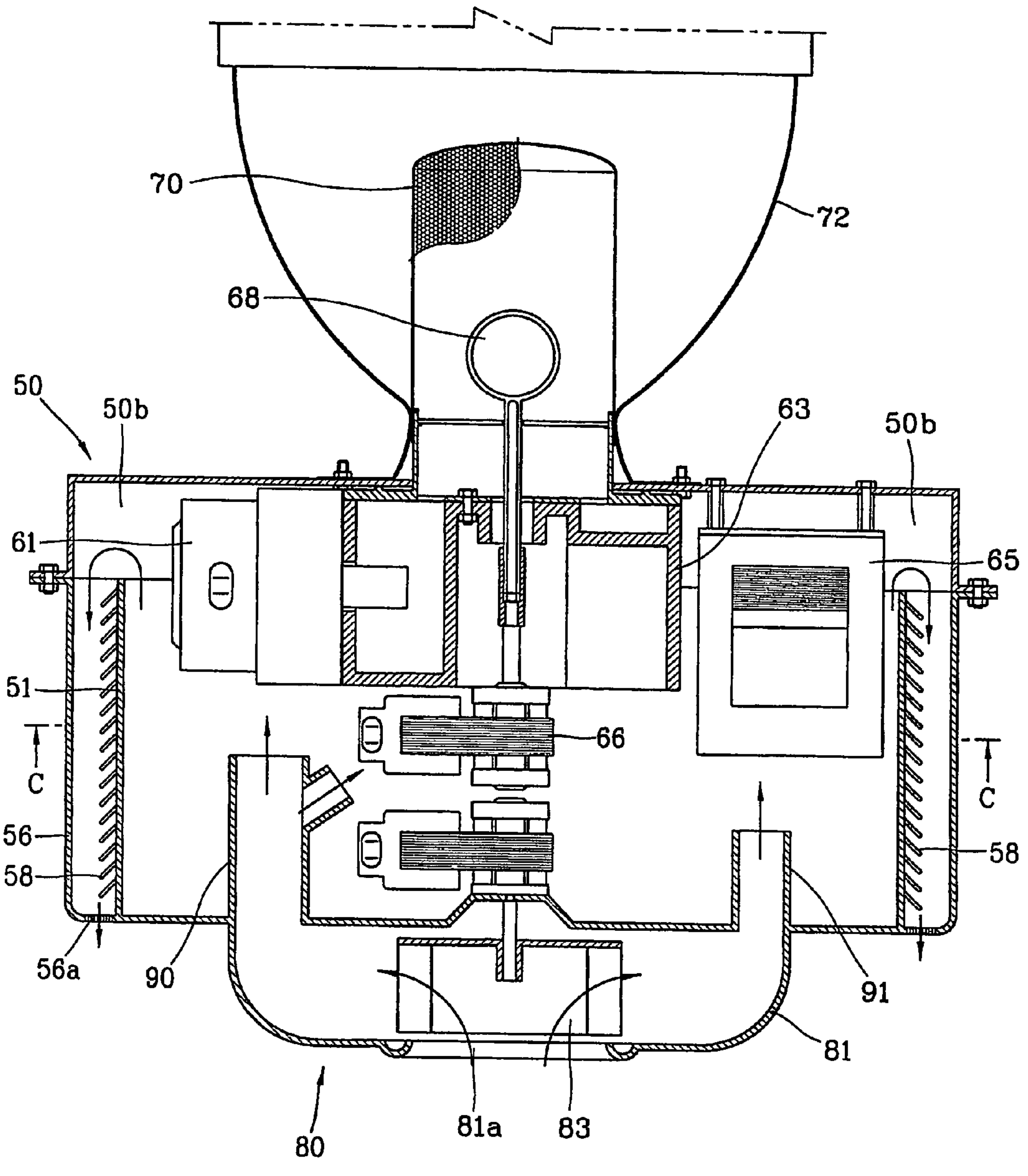
FIG. 8 is a longitudinal sectional view showing a plasma lighting system according to the fifth preferred embodiment of the present invention.
Figure 9:
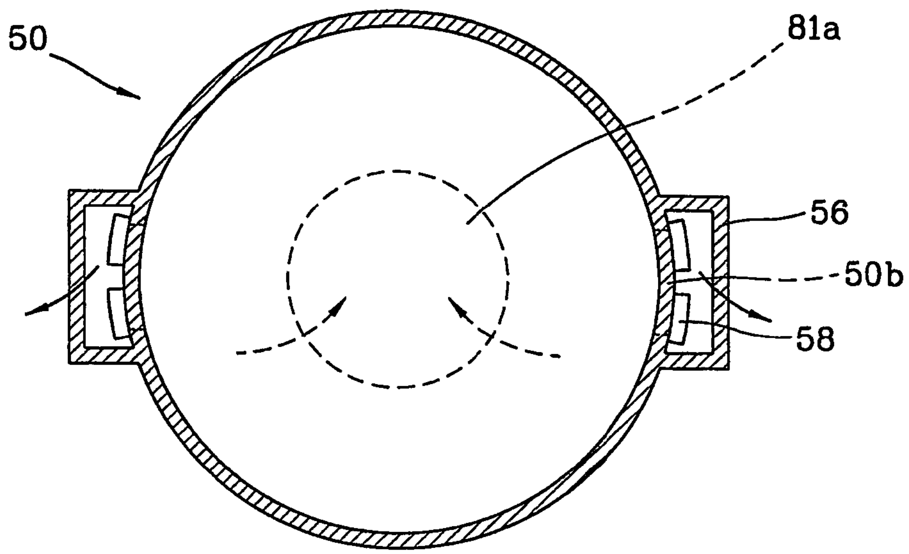
FIG. 9 is a sectional view of the case taken along line C-C of FIG. 8.

FIG. 8 is a longitudinal sectional view showing a plasma lighting system according to the fifth preferred embodiment of the present invention, and FIG. 9 is a sectional view of the case taken along line C-C of FIG. 8.

In the fifth preferred embodiment of the present invention, similarly to the third embodiment, air is discharged to the rear of the case 50 through the discharge duct 56 prolonged to the outer surface of the case 50.

One different thing is that radiation fins 58 protruded from the outer surface of the case 50 are provided at the inside of the discharge duct 56. The radiation fins 58 can be formed toward a flow direction of the discharge air or orthogonal to the flow direction of the discharge air. Also, a shape and an arrangement of the radiation fins 58 can be different according to a design condition or a necessity.

In the fifth embodiment of the present invention, a portion of heat generated in the case 50 is radiated outward through the radiation fins 58, and the air discharged through the discharge duct 56 is contacted to the radiation fins 58, so that a contact area with air is enlarged, thereby enhancing an entire cooling efficiency of the system.

Figure 10:
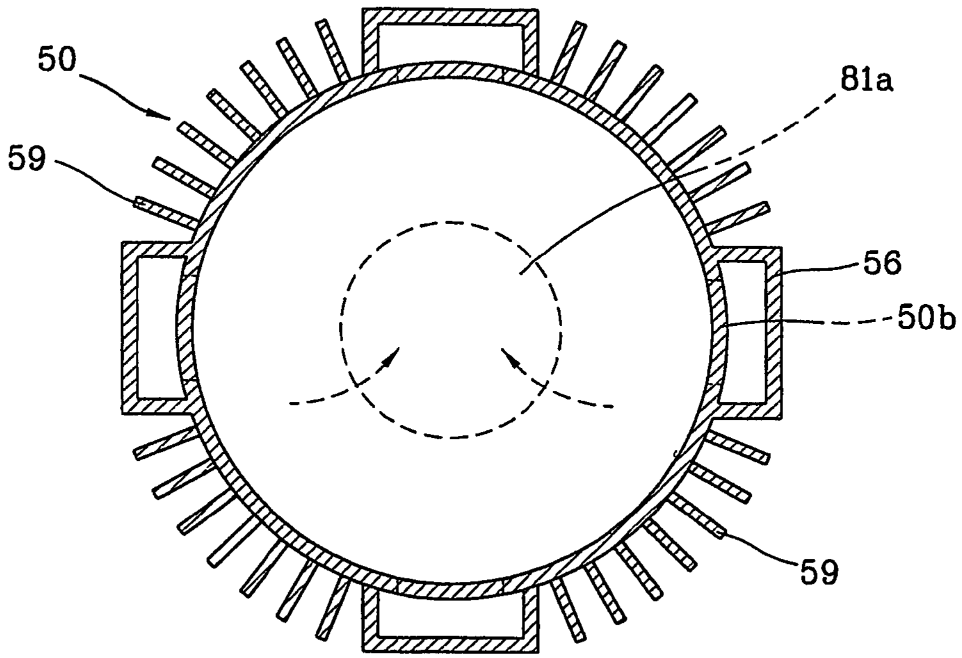
FIG. 10 is a cross-sectional view of the case according to the sixth preferred embodiment of the present invention.

FIG. 10 is a cross-sectional view of the case according to the sixth preferred embodiment of the present invention.

In the aforementioned third, fourth, and fifth embodiments, two discharge ducts 56 are formed at the outer surface of the case 50. However, in the sixth embodiment of the present invention, four discharge ducts 56 are formed at the outer surface of the case 50.

The discharge ducts 56 are located at the circumference surface of the case 50 with predetermined intervals. Also, the number of the discharge ducts 56 can be variously constructed according the design condition even if the present invention is constructed as four discharge ducts.

Especially, a plurality of radiation fins 59 for easily radiating heat in the case 50 are formed at the outer surface of the case 50. The radiation fins 59 are preferably formed at the outer surface of the case 50 where the discharge duct 56 is not formed.

In the sixth embodiment of the present invention, four discharge ducts 56 are constructed, thereby reducing a discharge flow resistance of air. Also, the plurality of radiation fins 59 are formed at the outer surface of the case 50, so that a cooling efficiency is enhanced.

INDUSTRIAL APPLICABILITY

In the cooling structure of the plasma lighting system according to the present invention, since a discharge flow rate is different according to a heat generation amount of the components and a design condition, a system can effectively cool the heat generating components of high temperature such as a magnetron, thereby prolonging life span of the components and improving a performance of the system without unnecessarily enlarging a fan capacity.

Also, in the present invention, since air that has cooled the heat generating components in the case is discharged to the rear of the case, warm air is not discharged to the lighting space, thereby not causing uncomfortable feeling to the user and enhancing convenience.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A cooling structure for a plasma lighting system comprising:

a case in which inner components are mounted; and a fan housing having at least one inlet port and at least two discharge ports having different discharge flow rates for discharging introduced external air into the case with different flow rates from each other in order to cool heat generation components in the case by introducing external air in the case, wherein a microwave generator and a bulb motor are located at one side in the case and a high voltage generator is located at the other side thereof, and the discharge port toward the microwave generator and the bulb motor has different discharge flow rate from the other discharge port toward the high voltage generator.

2. The structure of claim 1, wherein prolonged ducts for guiding the discharge air to each heat generating component are provided at the discharge ports of the fan housing.

3. The structure of claim 2, wherein at least one prolonged duct is composed of a distribution duct having at least two discharge ports in order to intensively cool at least two specific heat generating components.

4. The structure of claim 3, wherein the discharge port connected to the distribution duct has discharge flow rate larger than the other discharge port of the fan housing.

5. The structure of claim 3, wherein the discharge ports of the distribution duct are formed to have different discharge flow rates with respect to each other.

6. The structure of claim 1, wherein the discharge port toward the microwave generator and the bulb motor has a discharge flow rate larger than the other discharge port toward the high voltage generator.

7. The structure of claim 6, wherein a distribution duct composed of two discharge ports is connected to the discharge port toward the microwave generator and the bulb motor in order intensively to cool the microwave generator and the bulb motor, respectively.

8. The structure of claim 1, wherein the case is provided with the fan housing at the rear surface thereof to introduce external air and the case is provided with a case discharge port at the frontal surface thereof to discharge air which cooled heat generating components.

9. The structure of claim 8, wherein the case discharge port is provided with a discharge guide member formed with a round shape at the case discharge port.

10. The structure of claim 1, wherein the case is formed with a double cylinder structure having an inner case and an outer case, and external air circulating by the fan housing is introduced into the rear surface of the inner case, passes the inside of the inner case, flows to the inside of the outer case, and is discharged to the rear surface discharge port of the outer case.

11. The structure of claim 1, wherein a plurality of discharge ducts for discharging air which passed the inside of the case are provided at an outer surface of the case by being connected to the case.

12. The structure of claim 11, wherein the case includes a first discharge port connected to a frontal side of the discharge duct.

13. The structure of claim 12, wherein the case includes a second discharge port connected to a middle portion of the discharge duct.

14. The structure of claim 11, wherein the discharge duct has a first discharge port at the rear portion thereof and the second discharge port at the lateral portion thereof.

15. The structure of claim 11, wherein the case has a plurality of radiation fins protruded toward the inner side of the discharge duct.

16. The structure of claim 11, wherein a plurality of radiation fins are formed at the outer surface of the case.

17. The structure of claim 1, further comprising:

a distribution duct prolonged from one of said at least two discharge ports of the fan housing and the distribution duct having a plurality of discharge ports in order to intensively cool at least two heat generating components, respectively.

18. The structure of claim 17, wherein the distribution duct is composed of a main duct having great discharge flow rate and a diverged duct divided from the main duct.

19. The structure of claim 18, wherein the microwave generator and the bulb motor located around the microwave generator for rotating a bulb are provided in the case, and the main duct is formed toward the microwave generator and the diverged duct is formed toward the bulb motor.

20. The structure of claim 1, further comprising:

a plurality of discharge ducts at an outer surface of the case for discharging air which passed inside of the case to outside of the case, wherein the case includes a first discharge port connected to a frontal portion of the discharge duct and a second discharge port connected to a middle portion of the discharge duct.

21. The structure of claim 20, wherein the discharge duct has a first discharge port at the rear side thereof and a second discharge port at one side thereof

22. The structure of claim 1, further comprising: a plurality of discharge ducts at an outer surface of the case for discharging air which passed inside of the case, wherein the case includes a plurality of radiation fins protruded to inside of the discharge duct.

23. The structure of claim 1, further comprising:

a plurality of discharge ducts at an outer surface of the case for discharging air which passed inside of the case; and a plurality of radiation fins formed at the outer surface of the case for radiating inner heat of the case.

24. The structure of claim 23, wherein the discharge ducts are uniformly located at the outer circumference surface of the case with predetermined intervals, and the radiation fins are formed at a side where the discharge ducts are not formed.

25. The structure of claim 1, wherein the at least two discharge ports includes a first discharge port and a second discharge port, and the sectional area of the first discharge port is greater than the sectional area of the second discharge port.

* * * * *